(12) United States Patent
Nishida et al.

(10) Patent No.: US 10,797,324 B2
(45) Date of Patent: Oct. 6, 2020

(54) POWER GENERATION CELL

(71) Applicant: HONDA MOTOR CO., LTD., Minato-ku, Tokyo (JP)

(72) Inventors: Yosuke Nishida, Wako (JP); Kentaro Ishida, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 111 days.

(21) Appl. No.: 16/238,651

(22) Filed: Jan. 3, 2019

(65) Prior Publication Data
US 2019/0214654 A1 Jul. 11, 2019

(30) Foreign Application Priority Data
Jan. 9, 2018 (JP) .................................. 2018-001251

(51) Int. Cl.
| | | |
|---|---|---|
| *H01M 8/026* | (2016.01) | |
| *H01M 8/04082* | (2016.01) | |
| *H01M 8/1004* | (2016.01) | |
| *H01M 8/0263* | (2016.01) | |
| *H01M 8/0206* | (2016.01) | |
| *H01M 8/1018* | (2016.01) | |

(52) U.S. Cl.
CPC ......... *H01M 8/026* (2013.01); *H01M 8/0206* (2013.01); *H01M 8/0263* (2013.01); *H01M 8/04201* (2013.01); *H01M 8/1004* (2013.01); *H01M 2008/1095* (2013.01)

(58) Field of Classification Search
CPC .. H01M 8/026; H01M 8/0206; H01M 8/0263; H01M 8/04201; H01M 8/1004
See application file for complete search history.

(56) References Cited

U.S. PATENT DOCUMENTS 4,324,844 A * 4/1982 Kothmann ............... F28F 13/08
429/434

FOREIGN PATENT DOCUMENTS

| JP | 2000-294261 | 10/2000 |
|---|---|---|
| JP | 2006-108027 | 4/2006 |
| JP | 2009-076294 | 4/2009 |
| JP | 2009-081061 | 4/2009 |

OTHER PUBLICATIONS

Japanese Office Action for Japanese Patent Application No. 2018-001251 dated Jul. 2, 2019.

* cited by examiner

*Primary Examiner* — Helen Oi K Conley
(74) *Attorney, Agent, or Firm* — Amin, Turocy & Watson, LLP (57) ABSTRACT

Second inlet connection flow grooves and second outlet connection flow grooves are formed in a power generation cell. The second inlet connection flow grooves connect a fuel gas supply passage and a fuel gas flow field. The second outlet connection flow grooves connect a fuel gas discharge passage and the fuel gas flow field. The flow channel of the second inlet connection flow grooves diverges multiple times in an area from the fuel gas supply passage to the fuel gas flow field. The flow channel of the second outlet connection flow grooves merges multiple times in an area from the fuel gas flow field to the fuel gas discharge passage. The number of merging in the second outlet connection flow grooves is larger than the number of diverging in the second inlet connection flow grooves.

8 Claims, 6 Drawing Sheets

POWER GENERATION CELL

CROSS-REFERENCE TO RELATED APPLICATION

This application is based upon and claims the benefit of priority from Japanese Patent Application No. 2018-001251 filed on Jan. 9, 2018, the contents of which are incorporated herein by reference.

BACKGROUND OF THE INVENTION

Field of the Invention

The present invention relates to a power generation cell.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA). The membrane electrode assembly includes a solid polymer electrolyte membrane, an anode provided on one surface of the solid polymer electrolyte membrane, and a cathode on the other surface of the solid polymer electrolyte membrane.

The membrane electrode assembly is sandwiched between separators (bipolar plates) to form a power generation cell (unit fuel cell). In use, a predetermined number of power generation cells are stacked together to form, e.g., an in-vehicle fuel cell stack mounted in a vehicle.

In the fuel cell stack, a fuel gas flow field as one of reactant gas flow fields is formed between the MEA and one of the separators, and an oxygen-containing gas flow field as the other of the reactant gas flow fields is formed between the MEA and the other separator. Further, a fuel gas supply passage for supplying a fuel gas to the fuel gas flow field, a fuel gas discharge passage for discharging the fuel gas, an oxygen-containing gas supply passage for supplying an oxygen-containing gas to the oxygen-containing gas flow field, and an oxygen-containing gas discharge passage for discharging the oxygen-containing gas extend through the fuel cell stack in a stacking direction. An inlet connection channel is formed between the fuel gas flow field and the fuel gas supply passage, and an outlet connection channel is formed between the fuel gas flow field and the fuel gas discharge passage. Likewise, an inlet connection channel is formed between the oxygen-containing gas flow field and the oxygen-containing gas supply passage, and an outlet connection channel is formed between the oxygen-containing gas flow field and the oxygen-containing gas discharge passage (e.g., Japanese Laid-Open Patent Publication No. 2009-076294).

SUMMARY OF THE INVENTION

In this regard, in the case where water produced in a power generation cell is retained at an outlet of a reactant gas flow field, the performance of distributing the reactant gas is changed, and it may not be possible to distribute the reactant gas uniformly over the entire surface of the reactant gas flow field. For this reason, the power generation performance is decreased undesirably.

The present invention has been made taking the above problem into account, and an object of the present invention is to provide a power generation cell which makes it possible to improve the performance of discharging the produced water at an outlet of a reactant gas flow field.

In order to achieve the above object, a power generation cell of the present invention includes a membrane electrode assembly and a separator stacked together in a thickness direction of the separator. A reactant gas flow field is formed in the power generation cell. The reactant gas flow field is configured to allow a reactant gas to flow along a power generation surface from one end to another end of the separator. A reactant gas supply passage configured to supply the reactant gas toward the reactant gas flow field and a reactant gas discharge passage as a passage of the reactant gas which has passed through the reactant gas flow field extend through the power generation cell in the thickness direction of the separator. An inlet connection flow groove configured to connect the reactant gas supply passage and the reactant gas flow field and an outlet connection flow groove configured to connect the reactant gas discharge passage and the reactant gas flow field are formed in the power generation cell. A flow channel of the inlet connection flow groove diverges multiple times in an area from the reactant gas supply passage to the reactant gas flow field, and a flow channel of the outlet connection flow groove merges multiple times in an area from the reactant gas flow field to the reactant gas discharge passage, and the number of times that the flow channel of the outlet connection flow groove merges is larger than the number of times that the flow channel of the inlet connection flow groove diverges.

Preferably, the reactant gas supply passage includes one reactant gas supply passage that is provided at the center of the separator in the flow field width direction of the reactant gas flow field, and the reactant gas discharge passage includes two reactant gas discharge passages that are provided at respective both ends of the separator in the flow field width direction of the reactant gas flow field.

Preferably, the reactant gas flow field, the inlet connection flow groove, and the outlet connection flow groove are flow channels for a fuel gas.

Preferably, the outlet connection flow groove includes a plurality of first channel segments separated from one another by a plurality of ridges provided at intervals in the flow field width direction of the reactant gas flow field, and a plurality of second channel segments separated from one another by an intermediate projection, the intermediate projection being provided at a position closer to the reactant gas discharge passage than the plurality of ridges, and the number of the second channel segments is smaller than the number of the first channel segments.

Preferably, the intermediate projection is spaced from the plurality of ridges.

Preferably, the intermediate projection extends in a direction which intersects with a direction in which the plurality of ridges extend.

Preferably, one of the plurality of ridges has a length which is different from the lengths of other ridges.

In the power generation cell of the present invention, the number of merging in the outlet connection flow grooves is larger than the number of diverging in the inlet connection flow grooves. In the structure, the pressure loss when the reactant gas flows through the outlet connection flow grooves is increased. Therefore, it is possible to reliably achieve a desired differential pressure between the inlet and the outlet of the reactant gas flow field. Accordingly, it is possible to improve the performance of discharging the produced water at the outlet of the reactant gas flow field.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Hereinafter, a preferred embodiment of a power generation cell according to the present invention will be described with reference to the accompanying drawings.

Figure 1:
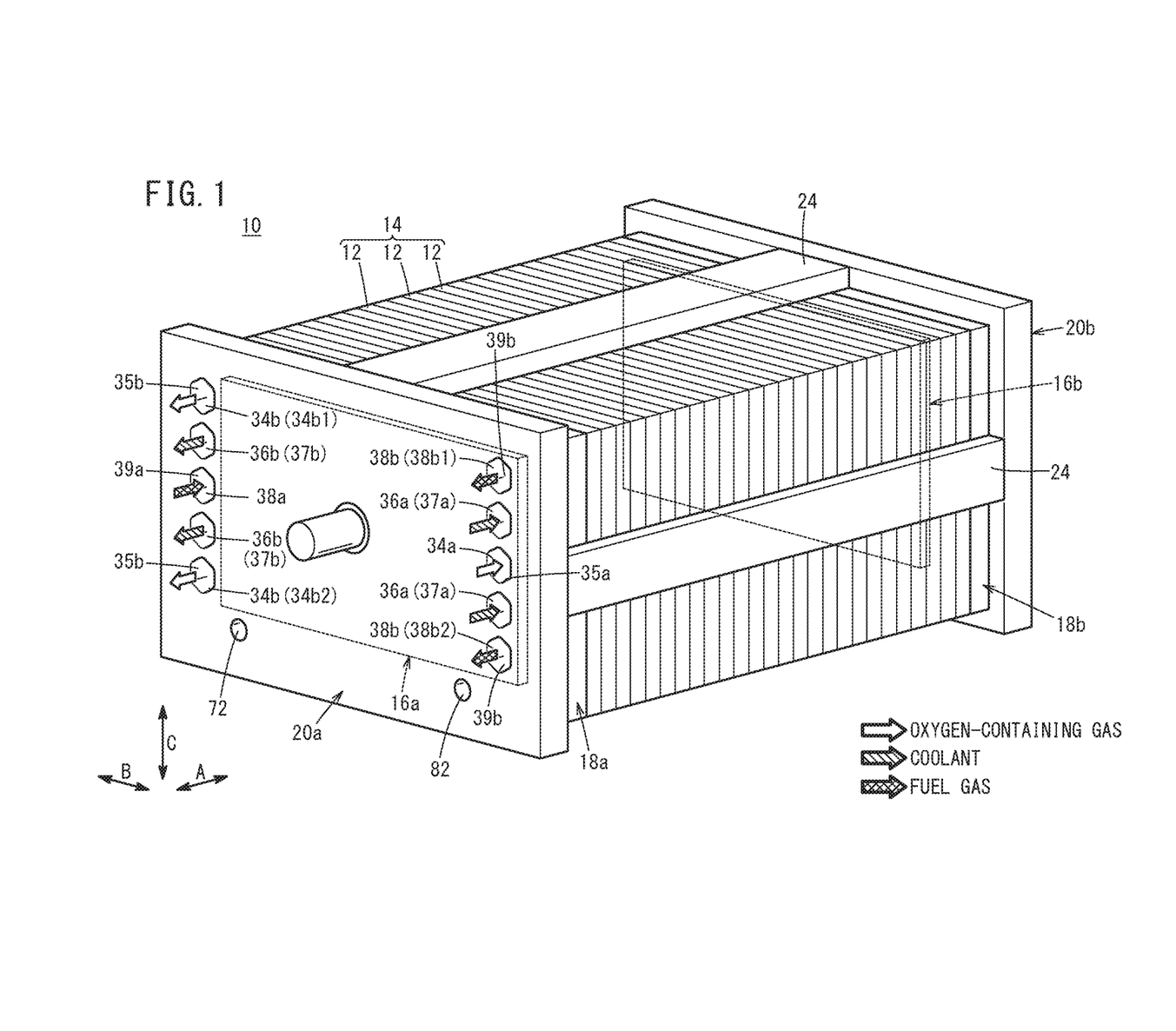
FIG. 1 is a perspective view showing a fuel cell stack including a power generation cell according to an embodiment of the present invention.

As shown in FIG. 1, a fuel cell stack 10 includes a stack body 14 formed by stacking a plurality of power generation cells (fuel cells) 12 in a horizontal direction (indicated by an arrow A) or in a gravity direction (indicated by an arrow C). For example, the fuel cell stack 10 is mounted in a fuel cell vehicle such as a fuel cell electric automobile (not shown).

At one end of the stack body 14 in the stacking direction indicated by the arrow A, a terminal plate (power collection plate) 16a is provided. An insulator 18a is provided outside the terminal plate 16a, and an end plate 20a is provided outside the insulator 18a. At another end of the stack body 14 in the stacking direction, a terminal plate 16b is provided. An insulator 18b is provided outside the terminal plate 16b, and an end plate 20b is provided outside the insulator 18b. The insulator 18a (one of the insulators 18a, 18b) is provided between the stack body 14 and the end plate 20a (one of the end plates 20a, 20b). The other insulator 18b is provided between the stack body 14 and the other end plate 20b. The insulators 18a, 18b are made of insulating material, such as polycarbonate (PC) or phenol resin, etc.

Each of the end plates 20a, 20b has a laterally elongated (or longitudinally elongated) rectangular shape. Coupling bars 24 are positioned between the sides of the end plates 20a, 20b. Both ends of the coupling bars 24 are fixed to inner surfaces of the end plates 20a, 20b to apply a tightening load to a plurality of stacked power generation cells 12 in the stacking direction indicated by the arrow A. It should be noted that the fuel cell stack 10 may have a casing including the end plates 20a, 20b, and the stack body 14 may be placed in the casing.

Figure 2:
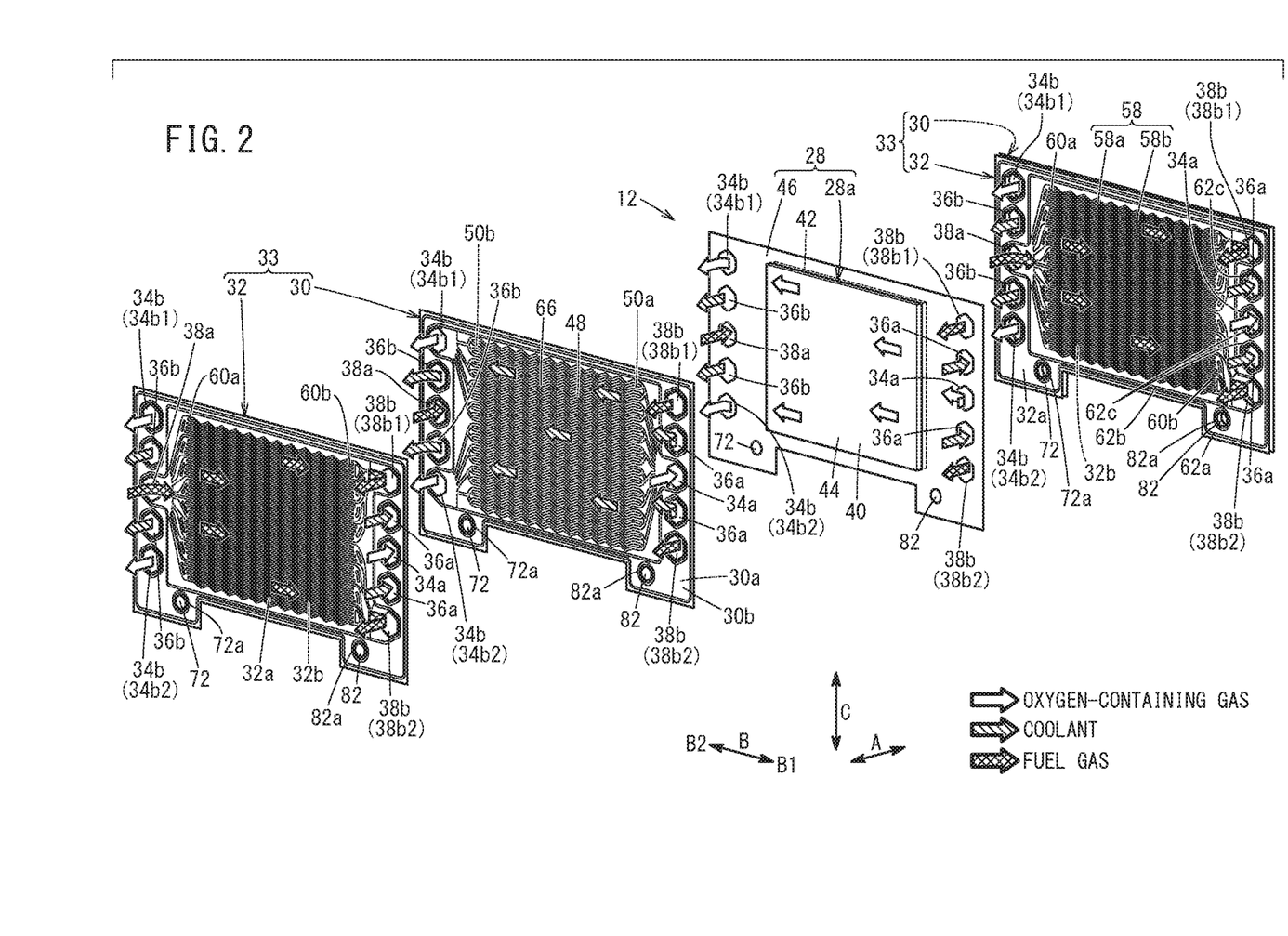
FIG. 2 is an exploded perspective view showing the power generation cell.

As shown in FIG. 2, in the power generation cell 12, a resin film equipped MEA 28 is sandwiched between a first metal separator 30 and a second metal separator 32. Each of the first metal separator 30 and the second metal separator 32 is formed by press forming of a metal thin plate to have a corrugated shape in cross section. For example, the metal plate is a steel plate, a stainless steel plate, an aluminum plate, a plate steel plate, or a metal plate having an anti-corrosive surface by surface treatment. Outer ends of the first metal separator 30 and the second metal separator 32 are joined together by welding, brazing, crimpling, etc. to form a joint separator 33.

The resin film equipped MEA 28 includes a membrane electrode assembly 28a (hereinafter referred to as the "MEA 28a"), and a resin frame member 46 joined to and provided around an outer peripheral portion of the MEA 28a. The MEA 28a includes an electrolyte membrane 40, an anode (first electrode) 42 provided on one surface of the electrolyte membrane 40, and a cathode (second electrode) 44 provided on another surface of the electrolyte membrane 40.

For example, the electrolyte membrane 40 includes a solid polymer electrolyte membrane (cation ion exchange membrane). For example, the solid polymer electrolyte membrane is a thin membrane of perfluorosulfonic acid containing water. The electrolyte membrane 40 is sandwiched between the anode 42 and the cathode 44. A fluorine based electrolyte may be used as the electrolyte membrane 40. Alternatively, an HC (hydrocarbon) based electrolyte may be used as the electrolyte membrane 40.

Though not shown in detail, the anode 42 includes a first electrode catalyst layer joined to one surface of the electrolyte membrane 40, and a first gas diffusion layer stacked on the first electrode catalyst layer. The cathode 44 includes a second electrode catalyst layer joined to the other surface of the electrolyte membrane 40, and a second gas diffusion layer stacked on the second electrode catalyst layer.

At one end of the power generation cell 12 in a longitudinal direction indicated by an arrow B (horizontal direction in FIG. 2), an oxygen-containing gas supply passage 34a (reactant gas supply passage), a plurality of coolant supply passages 36a, and a plurality of fuel gas discharge passages 38b (e.g., two fuel gas discharge passages 38b in the embodiment of the present invention) (reactant gas discharge passages) are provided. The oxygen-containing gas supply passage 34a, the coolant supply passages 36a, and the fuel gas discharge passages 38b extend through the power generation cell 12 in the stacking direction. The oxygen-containing gas supply passage 34a, the coolant supply passages 36a, and the plurality of fuel gas discharge passages 38b extend through the stack body 14, the insulator 18a, and the end plate 20a in the stacking direction (the oxygen-containing gas supply passage 34a, the coolant supply passages 36a, and the fuel gas discharge passages 38b may pass through the terminal plate 16a.)

These fluid passages are arranged in the vertical direction (indicated by the arrow C). A fuel gas such as a hydrogen-containing gas (one of reactant gases) is discharged through the fuel gas discharge passages 38b. An oxygen-containing gas (another of the reactant gases) is supplied through the oxygen-containing gas supply passage 34a. A coolant is supplied through the coolant supply passages 36a.

The oxygen-containing gas supply passage 34a is positioned between the two coolant supply passages 36a that are arranged in the vertical direction at a distance. The plurality of fuel gas discharge passages 38b include an upper fuel gas discharge passage 38b1 and a lower fuel gas discharge passage 38b2. The upper fuel gas discharge passage 38b1 is positioned above the upper coolant supply passage 36a. The lower fuel gas discharge passage 38b2 is positioned below the lower coolant supply passage 36a.

At another end of the power generation cell 12 in a direction indicated by the arrow B, a fuel gas supply passage 38a (reactant gas supply passage), a plurality of coolant discharge passages 36b, and a plurality of oxygen-containing gas discharge passages 34b (e.g., two oxygen-containing gas discharge passages 34b in the present embodiment) (reactant gas discharge passages) are provided. The fuel gas supply passage 38a, the coolant discharge passages 36b, and the oxygen-containing gas discharge passages 34b extend through the power generation cell 12 in the stacking direction. The fuel gas supply passage 38a, the plurality of coolant discharge passages 36b, and the plurality of oxygen-containing gas discharge passages 34b extend through the stack body 14, the insulator 18a, and the end plate 20a in the stacking direction (The fuel gas supply passage 38a, the coolant discharge passages 36b, and the oxygen-containing gas discharge passages 34b may extend through the terminal plate 16a.).

These fluid passages are arranged in the vertical direction (indicated by the arrow C). The fuel gas is supplied through the fuel gas supply passages 38a. The coolant is discharged through the coolant discharge passages 36b. The oxygen-containing gas is discharged through the oxygen-containing gas discharge passage 34b. The layout of the oxygen-containing gas supply passage 34a, the plurality of oxygen-containing gas discharge passages 34b, the fuel gas supply passage 38a, and the plurality of fuel gas discharge passages 38b is not limited to the above embodiment, and may be changed depending on the required specification.

The fuel gas supply passage 38a is positioned between the two coolant discharge passages 36b that are arranged in the vertical direction at a distance. The plurality of oxygen-containing gas discharge passages 34b include an upper oxygen-containing gas discharge passage 34b1 and a lower oxygen-containing gas discharge passage 34b2. The upper oxygen-containing gas discharge passage 34b1 is positioned above the upper coolant discharge passage 36b. The lower oxygen-containing gas discharge passage 34b2 is positioned below the lower coolant discharge passage 36b.

The openings of the fluid passages 34a, 34b, 36a, 36b, 38a, 38b are not limited to the hexagonal shape. The openings thereof may have any other polygonal (rectangular, pentagonal, etc.), circular, oval, ellipse shape, etc.

In the fuel cell stack 10, the first metal separator 30 and the second metal separator 32 have a first drain 72 for discharging water produced at the cathode in the fuel cell stack 10 during operation (power generation) of the fuel cell stack 10, and a second drain 82 for discharging water produced at the anode in the fuel cell stack 10 during operation (power generation) thereof. The first drain 72 extends through the fuel cell stack 10 in the stacking direction indicated by the arrow A, and the first drain 72 is connected to the oxygen-containing gas discharge passages 34b through a connection channel (not shown). The second drain 82 extends through the fuel cell stack 10 in the stacking direction indicated by the arrow A, and the second drain 82 is connected to the fuel gas discharge passage 38b through a connection channel (not shown). A bead seal 72a for preventing leakage of the produced water is provided around the first drain 72. A bead seal 82a for preventing leakage of the produced water is provided around the second drain 82.

As shown in FIG. 1, the oxygen-containing gas supply passage 34a, the coolant supply passages 36a, and the fuel gas supply passage 38a are connected to inlets 35a, 37a, 39a provided in the end plate 20a. Further, the oxygen-containing gas discharge passage 34b, the coolant discharge passage 36b, and the fuel gas discharge passage 38b are connected to outlets 35b, 37b, 39b provided in the end plate 20a.

As shown in FIG. 2, at one end of the resin frame member 46 in the direction indicated by the arrow B, the oxygen-containing gas supply passage 34a, the plurality of coolant supply passages 36a, and the plurality of fuel gas discharge passages 38b are provided. At the other end of the resin frame member 46 in the direction indicated by the arrow B, the fuel gas supply passage 38a, the plurality of coolant discharge passages 36b, and the plurality of oxygen-containing gas discharge passages 34b are provided.

The electrolyte membrane 40 may protrude outward without using the resin frame member 46. Further, a frame shaped film may be provided on both sides of the electrolyte membrane 40 which protrudes outward.

Figure 3:
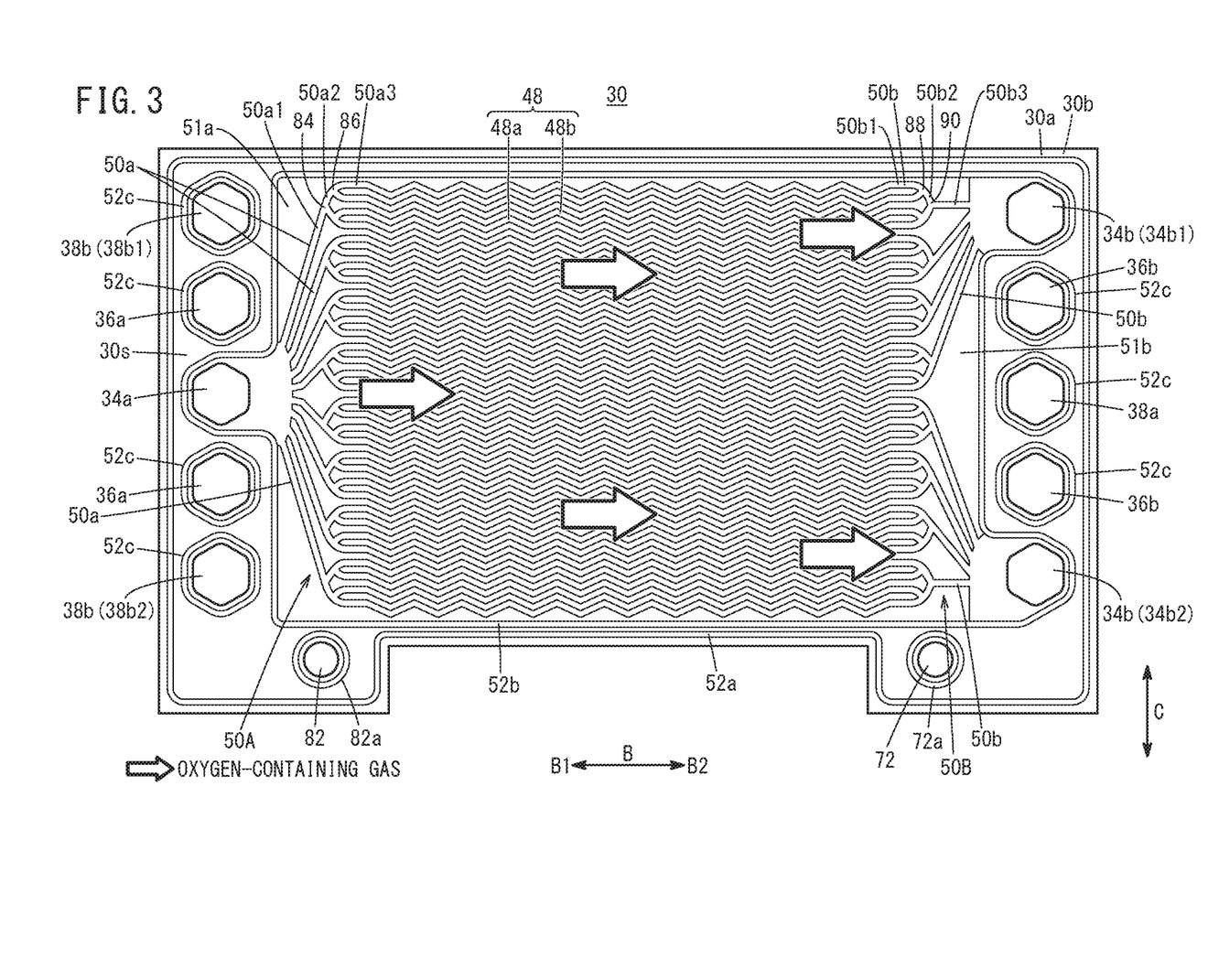
FIG. 3 is a view showing structure of a first metal separator as viewed from a side where an oxygen-containing gas flow field is present.

As shown in FIG. 3, the first metal separator 30 has an oxygen-containing gas flow field 48 (reactant gas flow field) on its surface 30a facing the resin film equipped MEA 28. The oxygen-containing gas flow field 48 extends in one direction, e.g., in the direction indicated by the arrow B. The oxygen-containing gas flow field 48 is connected to (in fluid communication with) the oxygen-containing gas supply passage 34a and the oxygen-containing gas discharge passages 34b.

The oxygen-containing gas flow field 48 includes a plurality of wavy flow grooves 48b formed between a plurality of wavy ridges 48a extending in the direction indicated by the arrow B. Therefore, in the oxygen-containing gas flow field 48, a plurality of wavy ridges 48a and a plurality of wavy flow grooves 48b are arranged alternately in the flow field width direction (indicated by the arrow C). In the oxygen-containing gas flow field 48, instead of adopting the above structure, a plurality of straight flow grooves may be formed between a plurality of straight ridges.

The oxygen-containing gas supply passage 34a is provided at one end of the first metal separator 30 in the longitudinal direction (at an end in the direction indicated by the arrow B1). The oxygen-containing gas supply passage 34a is a fluid passage that is provided at the center, among the five fluid passages arranged in the direction indicated by the arrow C. Therefore, one oxygen-containing gas supply passage 34a is provided at the center of the first metal separator 30 in the flow field width direction (indicated by the arrow C) of the oxygen-containing gas flow field 48. Two oxygen-containing gas discharge passages 34b are provided at the other end of the first metal separator 30 in the longitudinal direction (at an end in the direction indicated by the arrow B2). The oxygen-containing gas discharge passages 34b are fluid passages that are provided at both ends, among the five fluid passages arranged in the direction indicated by the arrow C. Therefore, the two oxygen-containing gas discharge passages 34b are provided at respective both ends of the first metal separator 30 in the flow field width direction of the oxygen-containing gas flow field 48.

A first inlet connection channel section 50A is provided on the surface 30a of the first metal separator 30. The first inlet connection channel section 50A connects the oxygen-containing gas supply passage 34a and the oxygen-containing gas flow field 48. In the embodiment of the present invention, the first inlet connection channel section 50A includes a plurality of first inlet connection flow grooves 50a. The first inlet connection flow grooves 50a are connected to the plurality of wavy flow grooves 48b. In the surface 30a of the first metal separator 30, a first inlet elevated part 51a is formed adjacent to one side of the oxygen-containing gas flow field 48 closer to the oxygen-containing gas supply passage 34a. The first inlet elevated part 51a is elevated from a base plate part 30s of the first metal separator 30 toward the resin film equipped MEA 28. The plurality of first inlet connection flow grooves 50a are provided in the first inlet elevated part 51a. The height of the first inlet elevated part 51a from the base plate part 30s is smaller than the height of an inner bead 52b as described later.

Further, a first outlet connection channel section 50B is provided on the surface 30a of the first metal separator 30. The first outlet connection channel section 50B connects the oxygen-containing gas flow field 48 and the two oxygen-containing gas discharge passages 34b. In the embodiment of the present invention, the first outlet connection channel section 50B includes a plurality of first outlet connection flow grooves 50b. The first outlet connection flow grooves 50b are connected to the wavy flow grooves 48b. In the surface 30a of the first metal separator 30, a first outlet elevated part 51b is formed adjacent to another side of the oxygen-containing gas flow field 48 in the direction indicated by the arrow B2. The first outlet elevated part 51b is elevated from the base plate part 30s of the first metal separator 30 toward the resin film equipped MEA 28. The first outlet connection flow grooves 50b are provided in the first outlet elevated part 51b. The height of the first outlet elevated part 51b from the base plate part 30s is smaller than the height of the inner bead 52b.

Each of the first inlet connection flow grooves 50a diverges multiple times (twice in the embodiment of the present invention) in an area from the oxygen-containing gas supply passage 34a to the oxygen-containing gas flow field 48. More specifically, each of the first inlet connection flow grooves 50a diverges at two positions (i.e., a first diverging point 84 and a second diverging point 86) in the area from the oxygen-containing gas supply passage 34a to the oxygen-containing gas flow field 48. That is, in each of the first inlet connection flow grooves 50a, one channel segment 50a1 diverges into two channel segments 50a2 at the first diverging point 84. Then, each of the channel segments 50a2 diverges further into two channel segments 50a3 at the second diverging point 86. The number of times that the flow channel diverges (i.e., the number of diverging) in the first inlet connection flow grooves 50a is not limited to two times, and may be a different number of times.

Each of the first outlet connection flow grooves 50b merges multiple times (twice in the embodiment of the present invention) in an area from the oxygen-containing gas flow field 48 to the oxygen-containing gas discharge passages 34b. More specifically, each of the first outlet connection flow grooves 50b merges at two positions (i.e., a first merging point 88 and a second merging point 90) in the area from the oxygen-containing gas flow field 48 to the oxygen-containing gas discharge passages 34b. That is, in each of the first outlet connection flow grooves 50b, the adjacent channel segments 50b1 among four channel segments 50b1 connected to the oxygen-containing gas flow field 48 merge at the first merging point 88 into two channel segments 50b2. Then, the two channel segments 50b2 merge at the second merging point 90 into one channel segment 50b3. The number of times that the flow channel merges (i.e., the number of merging) in the first outlet connection flow grooves 50b is not limited to two times, may be a different number of times.

A plurality of metal bead seals are formed integrally on the surface 30a of the first metal separator 30 by press forming. The metal bead seals are expanded toward the resin film equipped MEA 28. Instead of the metal bead seals, ridge shaped elastic seals made of elastic material may be provided. The plurality of metal bead seals include an outer bead 52a, an inner bead 52b, and a plurality of passage beads 52c. The outer bead 52a is provided along the outer end of the surface 30a. The inner bead 52b is provided around the oxygen-containing gas flow field 48, the oxygen-containing gas supply passage 34a, and the oxygen-containing gas discharge passages 34b while allowing the oxygen-containing gas flow field 48 to be connected to the oxygen-containing gas supply passage 34a and the oxygen-containing gas discharge passages 34b.

The plurality of passage beads 52c are provided around the fuel gas supply passage 38a, the fuel gas discharge passages 38b, the coolant supply passages 36a, and the coolant discharge passages 36b, respectively. The outer bead 52a should be provided as necessary. Alternatively, the outer bead 52a may be omitted.

Figure 4:
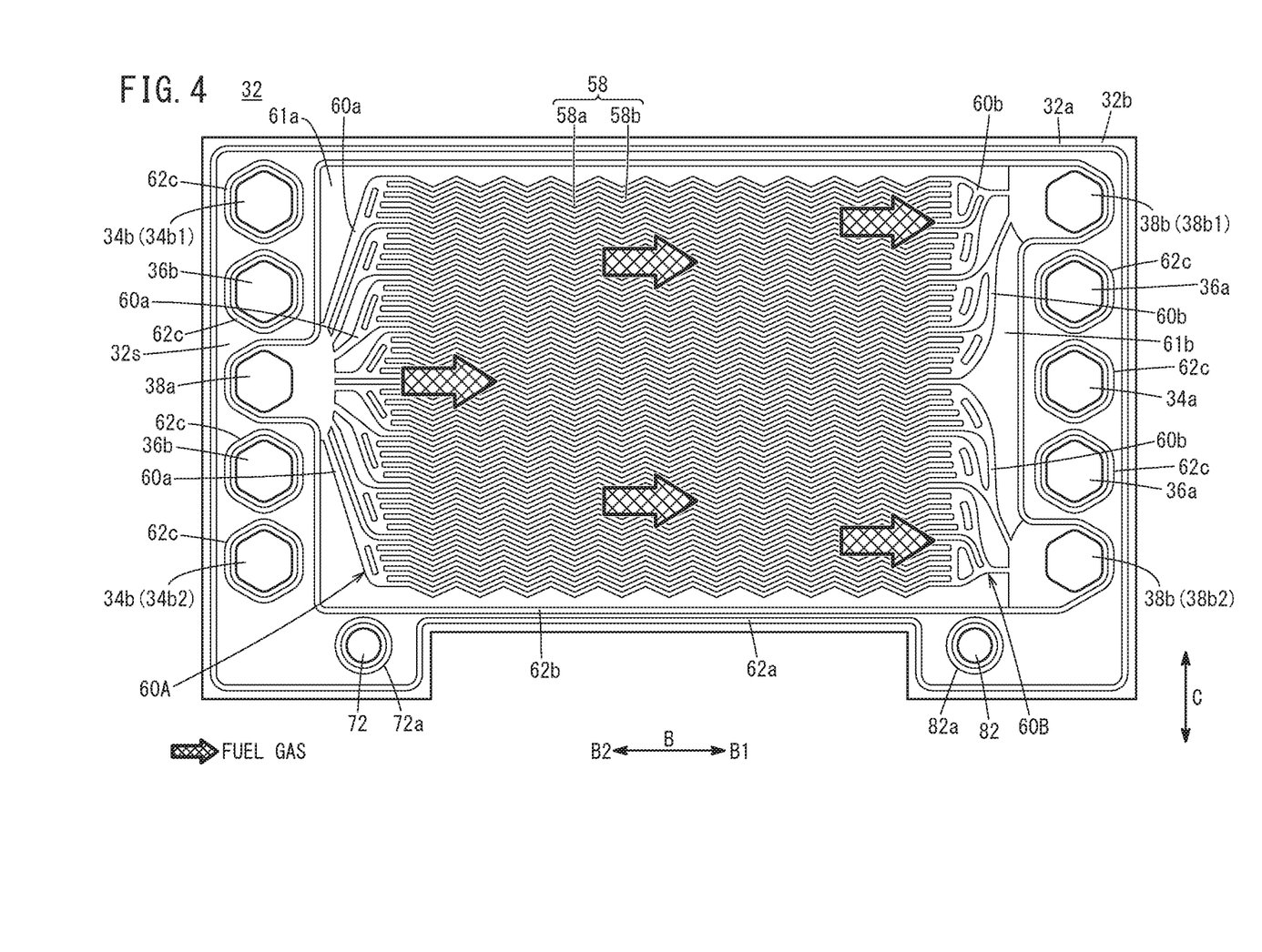
FIG. 4 is a view showing structure of a second metal separator as viewed from a side where a fuel gas flow field is present.

As shown in FIG. 4, the second metal separator 32 has a fuel gas flow field 58 (reactant gas flow field) on its surface 32a facing the resin film equipped MEA 28. The fuel gas flow field 58 extends in one direction, e.g., in the direction indicated by the arrow B. The fuel gas flows across the fuel gas flow field 58 in a direction (indicated by an arrow B1) opposite to the direction in which the oxygen-containing gas flows across the oxygen-containing gas flow field 48. The fuel gas flow field 58 is connected to (in fluid communication with) the fuel gas supply passage 38a, and the fuel gas discharge passages 38b. The fuel gas flow field 58 has a plurality of wavy flow grooves 58b formed between a plurality of wavy ridges 58a extending in the direction indicated by the arrow B. Therefore, in the fuel gas flow field 58, the plurality of wavy ridges 58a and the plurality of wavy flow grooves 58b are arranged alternately in the flow field width direction (indicated by the arrow C). Instead of adopting the above structure, the fuel gas flow field 58 may have a plurality of straight flow grooves between a plurality of straight ridges.

The fuel gas supply passage 38a is provided at one end of the second metal separator 32 in the longitudinal direction (at an end in the direction indicated by the arrow B2). The fuel gas supply passage 38a is a fluid passage that is provided at the center, among the five fluid passages arranged in the direction indicated by the arrow C. Therefore, one fuel gas supply passage 38a is provided at the center of the second metal separator 32 in the flow field width direction (indicated by the arrow C) of the fuel gas flow field 58. Two fuel gas discharge passages 38b are provided at the other end of the second metal separator 32 in the longitudinal direction (at an end in the direction indicated by the arrow B1). The two fuel gas discharge passages 38b are fluid passages that are provided at both ends, among the five fluid passages arranged in the direction indicated by the arrow C. Therefore, the two fuel gas discharge passages 38b are provided at both ends of the second metal separator 32 in the flow field width direction of the fuel gas flow field 58.

A second inlet connection channel section 60A is provided on the surface 32a of the second metal separator 32. The second inlet connection channel section 60A connects the fuel gas supply passage 38a and the fuel gas flow field 58. In the embodiment of the present invention, the second inlet connection channel section 60A includes a plurality of second inlet connection flow grooves 60a. The second inlet connection flow grooves 60a are connected to the plurality of wavy flow grooves 58b. In the surface 32a of the second metal separator 32, a second inlet elevated part 61a is formed adjacent to one side of the fuel gas flow field 58 in the direction indicated by the arrow B2. The second inlet elevated part 61a is elevated from a base plate part 32s of the second metal separator 32 toward the resin film equipped MEA 28. The plurality of second inlet connection flow groove 60a are formed in the second inlet elevated part 61a.

The height of the second inlet elevated part 61a from the base plate part 32s is smaller than the height of the inner bead 62b described later.

Further, a second outlet connection channel section 60B is provided on the surface 32a of the second metal separator 32. The second outlet connection channel section 60B connects the fuel gas flow field 58 and the fuel gas discharge passages 38b. In the embodiment of the present invention, the second outlet connection channel section 60B includes a plurality of second outlet connection flow grooves 60b. The second outlet connection flow grooves 60b are connected to the wavy flow grooves 58b. In the surface 32a of the second metal separator 32, a second outlet elevated part 61b is formed adjacent to another side of the fuel gas flow field 58 in the direction indicated by the arrow B1. The second outlet elevated part 61b is elevated from the base plate part 32s of the second metal separator 32 toward the resin film equipped MEA 28. The second outlet connection flow grooves 60b are formed in the second outlet elevated part 61b. The height of the second outlet elevated part 61b from the base plate part 32s is smaller than the height of the inner bead 62b.

Figure 5:
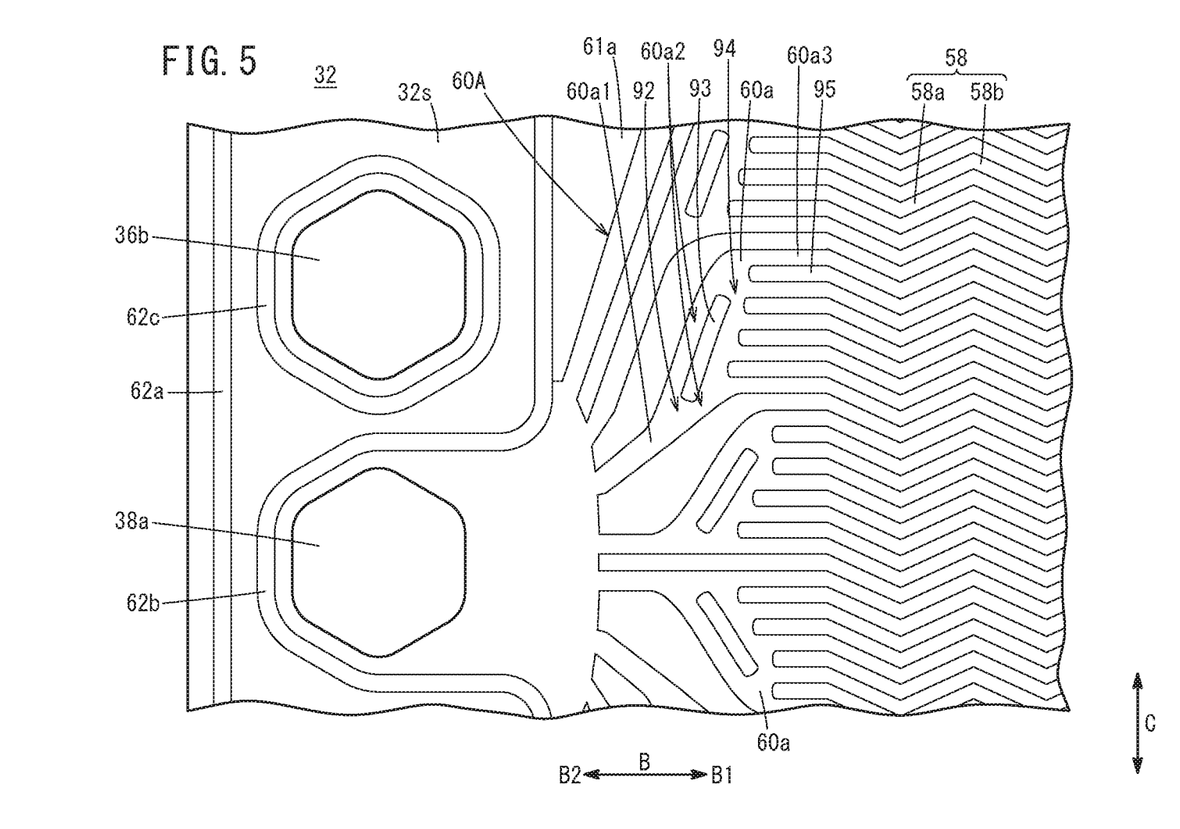
FIG. 5 is an enlarged view showing a second inlet connection channel section.

As shown in FIG. 5, each of the second inlet connection flow groove 60a diverges multiple times (twice in the embodiment of the present invention) in an area from the fuel gas supply passage 38a to the fuel gas flow field 58. More specifically, each of the second inlet connection flow grooves 60a diverges at two positions (i.e., a first diverging point 92 and a second diverging point 94) in the area from the fuel gas supply passage 38a to the fuel gas flow field 58. That is, in each of the second inlet connection flow grooves 60a, one first channel segment 60a1 diverges at the first diverging point 92 into two second channel segments 60a2 on both sides of an intermediate projection 93. Further, the two second channel segments 60a2 diverge at the second diverging point 94 into five third channel segments 60a3.

The intermediate projection 93 is in the form of an island positioned between the first diverging point 92 and the second diverging point 94. The intermediate projection 93 is surrounded by the flow channel (flow grooves) over the entire periphery. The intermediate projection 93 protrudes toward the resin film equipped MEA 28 to separate the two second channel segments 60a2. The five third channel segments 60a3 are separated by a plurality of ridges 95 protruding toward the resin film equipped MEA 28. The plurality of ridges 95 are spaced from each other in the flow field width direction (indicated by the arrow C) of the fuel gas flow field 58. At least one of the ridges 95 has a length which is different from the length(s) of the other ridges 95. The plurality of ridges 95 face the intermediate projection 93, and have lengths which increase stepwise. It should be noted that all of the plurality of ridges 95 may have the same length. The ridges 95 are non-continuous with (spaced from) the intermediate projection 93. Therefore, a flow channel (part of the second inlet connection flow grooves 60a) is formed between the plurality of ridges 95 and the intermediate projection 93. The intermediate projection 93 extends in a direction intersecting with the direction in which the ridges 95 extend.

Figure 6:
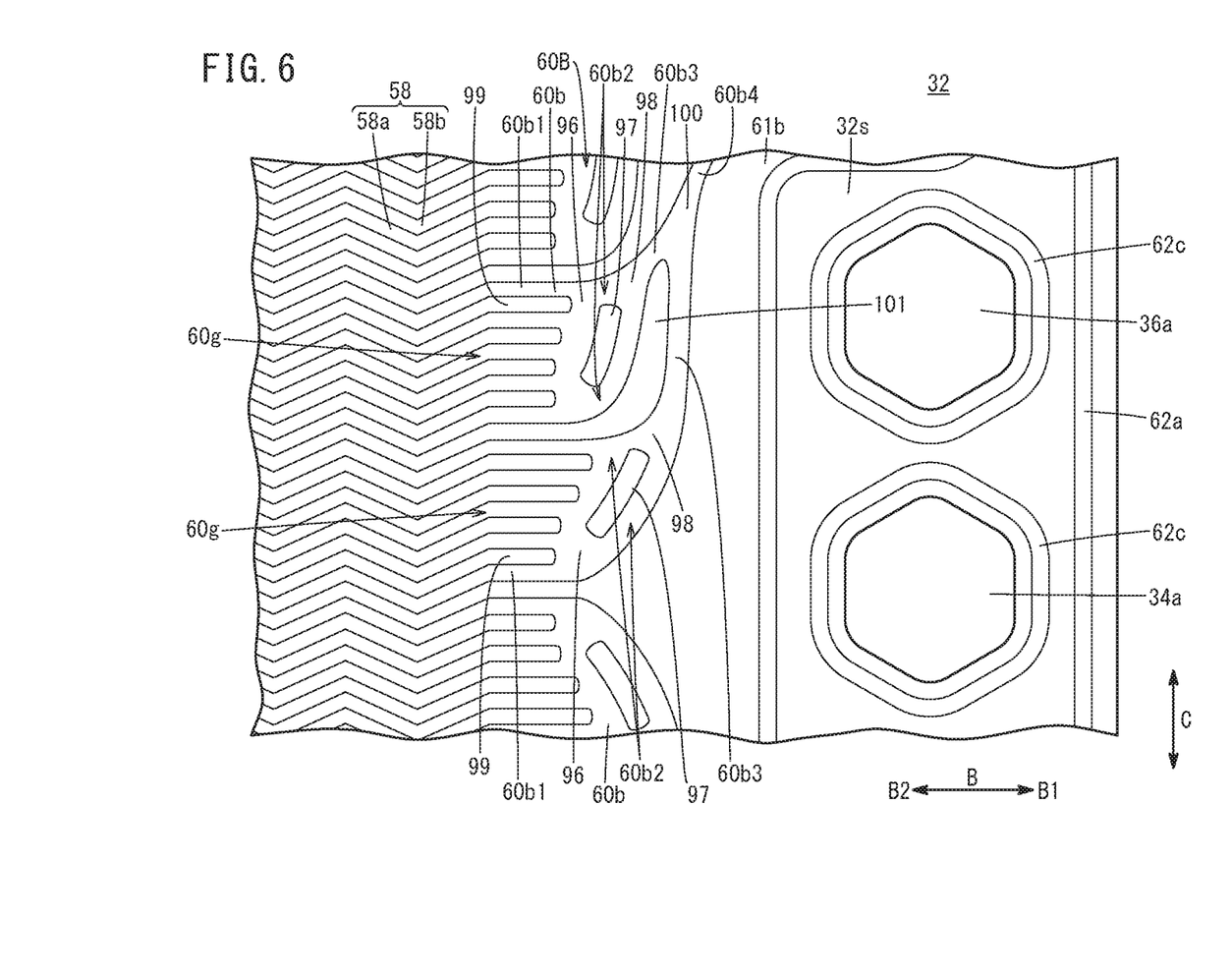
FIG. 6 is an enlarged view showing a second outlet connection channel section.

As shown in FIG. 6, each of the second outlet connection flow grooves 60b merges multiple times (three times in the embodiment of the present invention) in an area from the fuel gas flow field 58 to the fuel gas discharge passages 38b. The number of merging in the second outlet connection flow grooves 60b is larger than the number of diverging in the second inlet connection flow grooves 60a. More specifically, each of the second outlet connection flow grooves 60b diverges at three positions (i.e., a first merging point 96, a second merging point 98, and a third merging point 100) in the area from the fuel gas flow field 58 to the fuel gas discharge passages 38b.

The second outlet connection flow grooves 60b have groups 60g each including five first channel segments 60b1 connected to the fuel gas flow field 58, and two adjacent groups of the groups 60g are paired. In each group 60g, the five first channel segments 60b1 merge at the first merging point 96, into two second channel segments 60b2. Further, in each group 60g, the two second channel segments 60b2 merge at the second merging point 98, into one third channel segment 60b3. Then, in each pair of the two adjacent groups 60g, two third channel segments 60b3 of one of the groups and the other of the groups merge at the third merging point 100, into one fourth channel segment 60b4 connected to the fuel gas discharge passage 38b.

The five first channel segments 60b1 are separated by a plurality of ridges 99 protruding toward the resin film equipped MEA 28. The plurality of ridges 99 are spaced from each other in the flow field width direction (indicated by the arrow C) of the fuel gas flow field 58. At least one of the ridges 99 has a length which is different from the length(s) of the other ridges 99. The plurality of ridges 99 face an intermediate projection 97, and have lengths which increase stepwise. It should be noted that all of the plurality of ridges 99 may have the same length.

The intermediate projection 97 is in the form of an island provided between the first merging point 96 and the second merging point 98. The intermediate projection 97 is surrounded by the flow channel (flow grooves) over the entire periphery. The intermediate projection 97 protrudes toward the resin film equipped MEA 28 to separate the two second channel segments 60b2. The intermediate projection 97 is non-continuous with (spaced from) the plurality of ridges 99. Therefore, a channel (part of the second outlet connection flow grooves 60b) is formed between the plurality of ridges 99 and the intermediate projection 97. The intermediate projection 97 extends in a direction intersecting with the direction in which the ridges 99 extend. The two third channel segments 60b3 in each pair of the groups of the second outlet connection flow grooves 60b are separated by a projection 101 protruding toward the resin film equipped MEA 28. The third merging point 100 is provided downstream of the projection 101. The two third channel segments 60b3 merge at the third merging point 100, into one fourth channel segment 60b4. The projection 101 is longer than the intermediate projection 97 in the flow field width direction (indicated by the arrow C) of the fuel gas flow field 58. The projection 101 is continuous with the wavy ridge 58a.

It should be noted that the number of times that the flow channel merges in the second outlet connection flow grooves 60b is not limited to three times, and may be a different number of times as long as the number of merging is larger than the number of diverging in the second inlet connection flow grooves 60a.

As shown in FIG. 4, a plurality of metal bead seals are formed on the surface 32a of the second metal separator 32 by press forming. The metal bead seals are expanded toward the resin film equipped MEA 28. Instead of the metal bead seals, ridge shaped elastic seals made of elastic material may be provided. The plurality of metal bead seals include an outer bead 62a, an inner bead 62b, and a plurality of passage beads 62c. The outer bead 62a is provided along the outer end of the surface 32a. The inner bead 62b is provided inside the outer bead 62a, around the fuel gas flow field 58, the fuel gas supply passage 38a, the fuel gas discharge passages 38b while allowing the fuel gas flow field 58 to be connected to the fuel gas supply passage 38*a* and the fuel gas discharge passages 38*b*.

The plurality of passage beads 62*c* are formed around the oxygen-containing gas supply passage 34*a*, the oxygen-containing gas discharge passages 34*b*, the coolant supply passages 36*a*, and the coolant discharge passages 36*b*, respectively. The outer bead 62*a* should be provided as necessary. Alternatively, the outer bead 62*a* may be omitted.

As shown in FIG. 2, a coolant flow field 66 is formed between a surface 30*b* of the first metal separator 30 and a surface 32*b* of the second metal separator 32 that are joined together by welding or brazing. The coolant flow field 66 is connected to (in fluid communication with) the coolant supply passages 36*a* and the coolant discharge passages 36*b*. When the first metal separator 30 and the second metal separator 32 are stacked together, the coolant flow field 66 is formed between a surface of the first metal separator 30 on the back of the oxygen-containing gas flow field 48, and a surface of the second metal separator 32 on the back of the fuel gas flow field 58. The coolant flows in the coolant flow field 66 in the same direction (indicated by the arrow B) as the direction in which the oxygen-containing gas flows in the oxygen-containing gas flow field 48.

Operation of the fuel cell stack 10 having the above structure will be described below.

Firstly, as shown in FIG. 1, an oxygen-containing gas such as air is supplied to the oxygen-containing gas supply passage 34*a* (inlet 35*a*) of the end plate 20*a*. The fuel gas such as the hydrogen-containing gas is supplied to the fuel gas supply passage 38*a* (inlet 39*a*) of the end plate 20*a*. A coolant such as pure water, ethylene glycol, oil is supplied to the coolant supply passages 36*a* (inlets 37*a*) of the end plate 20*a*.

As shown in FIG. 3, the oxygen-containing gas flows from the oxygen-containing gas supply passage 34*a* into the oxygen-containing gas flow field 48 of the first metal separator 30. The oxygen-containing gas flows along the oxygen-containing gas flow field 48 in the direction indicated by the arrow B, and the oxygen-containing gas is supplied to the cathode 44 of the MEA 28*a*.

In the meanwhile, as shown in FIG. 4, the fuel gas is introduced from the fuel gas supply passage 38*a* into the fuel gas flow field 58 of the second metal separator 32. The fuel gas flows along the fuel gas flow field 58 in the direction indicated by the arrow B, and the fuel gas is supplied to the anode 42 of the MEA 28*a*.

Thus, in each MEA 28*a*, the oxygen-containing gas supplied to the cathode 44 and the fuel gas supplied to the anode 42 are partially consumed in electrochemical reactions in the second electrode catalyst layer and the first electrode catalyst layer to generate electricity.

Then, as shown in FIG. 2, the oxygen-containing gas supplied to the cathode 44 and partially consumed at the cathode 44 is discharged along the oxygen-containing gas discharge passages 34*b* in the direction indicated by the arrow A. Likewise, the fuel gas supplied to the anode 42 and partially consumed at the anode 42 is discharged along the fuel gas discharge passages 38*b* in the direction indicated by the arrow A.

Further, the coolant supplied to the coolant supply passages 36*a* flows into the coolant flow field 66 formed between the first metal separator 30 and the second metal separator 32, and then, the coolant flows in the direction indicated by the arrow B. After the coolant cools the MEA 28*a*, the coolant is discharged from the coolant discharge passages 36*b*.

In this case, the power generation cell 12 according to the embodiment of the present invention offers the following advantages.

In the power generation cell 12, the number of times that the second outlet connection flow grooves 60*b* merge is larger than the number of times that the second inlet connection flow grooves 60*a* diverge. In the structure, the pressure loss when the fuel gas flows through the second outlet connection flow grooves 60*b* is increased. Therefore, it is possible to reliably achieve a desired differential pressure between the inlet and the outlet of the fuel gas flow field 58. Accordingly, it is possible to improve the performance of discharging the produced water at the outlet of the fuel gas flow field 58. That is, the produced water can be discharged to the fuel gas discharge passage 38*b* suitably through the second outlet connection flow grooves 60*b*.

One fuel gas supply passage 38*a* is provided at the center of the second metal separator 32 in the flow field width direction of the fuel gas flow field 58. Further, two fuel gas discharge passages 38*b* are provided at respective both ends of the second metal separator 32 in the flow field width direction of the fuel gas flow field 58. In the second outlet connection flow grooves 60*b* having the above structure, since the length of the flow channel from the flow inlet to the flow outlet can be shortened, it is possible to improve the flow rate distribution characteristics of the fuel gas flow field 58 in the flow field width direction (achieve the uniform flow rate in the flow field width direction).

The second inlet connection flow grooves 60*a* and the second outlet connection flow grooves 60*b* are flow grooves for the fuel gas. In the case where, in particular, only a hydrogen gas (pure hydrogen) is supplied to the anode as the fuel gas, during operation of the fuel cell stack 10, since most of the hydrogen gas is consumed in the electrochemical reaction at the anode, in the conventional structure, the flow rate of the hydrogen gas is decreased at the outlet of the fuel gas flow field 58, and thus, the differential pressure tends to be insufficient. Under the circumstances, the performance of discharging the produced water may not be sufficient. In contrast, in the embodiment of the present invention, in the second inlet connection flow grooves 60*a* and the second outlet connection flow grooves 60*b* through which the fuel gas flows, since the number of merging in the second outlet connection flow grooves 60*b* is larger than the number of diverging in the second inlet connection flow grooves 60*a*, it is possible to effectively improve the performance of discharging the produced water at the outlet of the fuel gas flow field 58 where the differential pressure tends to be insufficient in the conventional structure.

It should be noted that, in the power generation cell 12, as in the case of the second inlet connection flow grooves 60*a* and the second outlet connection flow groove 60*b*, the number of merging in the first outlet connection flow grooves 50*b* may be larger than the number of diverging of the first inlet connection flow grooves 50*a*. In this manner, it is possible to improve the performance of discharging the produced water at the outlet of the oxygen-containing gas flow field 48.

The embodiment of the present invention adopts cell-by-cell cooling structure where each of cell units is formed by sandwiching a membrane electrode assembly between two metal separators, and a coolant flow field is formed between the adjacent unit cells. Alternatively, for example, the cell unit may include three or more metal separators and two or more membrane electrode assemblies, and the metal separators and the membrane electrode assemblies are stacked alternately. In this case, so called skip cooling structure where a coolant flow field is formed between the adjacent cell units is adopted.

The present invention is not limited to the above described embodiment. It is a matter of course that various modifications may be made without departing from the gist of the present invention.

What is claimed is:

1. A power generation cell comprising:
a membrane electrode assembly and a separator stacked together in a thickness direction of the separator,
wherein a reactant gas flow field is formed in the power generation cell, the reactant gas flow field being configured to allow a reactant gas to flow along a power generation surface from one end to another end of the separator;
a reactant gas supply passage configured to supply the reactant gas toward the reactant gas flow field and a reactant gas discharge passage as a passage of the reactant gas which has passed through the reactant gas flow field extend through the power generation cell in the thickness direction of the separator;
an inlet connection flow groove configured to connect the reactant gas supply passage and the reactant gas flow field and an outlet connection flow groove configured to connect the reactant gas discharge passage and the reactant gas flow field are formed in the power generation cell, and
wherein, a flow channel of the inlet connection flow groove diverges multiple times in an area from the reactant gas supply passage to the reactant gas flow field; and
a flow channel of the outlet connection flow groove merges multiple times in an area from the reactant gas flow field to the reactant gas discharge passage; and
a number of times that the flow channel of the outlet connection flow groove merges is larger than a number of times that the flow channel of the inlet connection flow groove diverges.

2. The power generation cell according to claim 1, wherein the reactant gas supply passage comprises one reactant gas supply passage that is provided at a center of the separator in a flow field width direction of the reactant gas flow field; and
the reactant gas discharge passage comprises two reactant gas discharge passages that are provided at respective both ends of the separator in the flow field width direction of the reactant gas flow field.

3. The power generation cell according to claim 1, wherein the reactant gas flow field, the inlet connection flow groove, and the outlet connection flow groove are flow channels for a fuel gas.

4. The power generation cell according to claim 1, wherein the outlet connection flow groove includes a plurality of first channel segments separated from one another by a plurality of ridges provided at intervals in a flow field width direction of the reactant gas flow field, and a plurality of second channel segments separated from one another by an intermediate projection, the intermediate projection being provided at a position closer to the reactant gas discharge passage than the plurality of ridges; and
a number of the second channel segments is smaller than a number of the first channel segments.

5. The power generation cell according to claim 4, wherein the intermediate projection is spaced from the plurality of ridges.

6. The power generation cell according to claim 4, wherein the intermediate projection extends in a direction which intersects with a direction in which the plurality of ridges extend.

7. The power generation cell according to claim 4, wherein one of the plurality of ridges has a length which is different from lengths of other ridges.

8. The power generation cell according to claim 4, wherein the intermediate projection extends in a direction which is inclined with respect to a direction in which the plurality of ridges extend.

* * * * *